(12) United States Patent
Dini

(10) Patent No.: US 8,840,818 B2
(45) Date of Patent: Sep. 23, 2014

(54) SYSTEM FOR THE INJECTION MOULDING OF PLASTIC MATERIAL, PARTICULARLY SUITABLE FOR THE MOULDING OF PIECES HAVING THE FORM OF A SOLID OF REVOLUTION OR SIMILAR, AND CORRESPONDING METHOD

(75) Inventor: Maurizio Dini, Strambino (IT)

(73) Assignee: Ergotech S.R.L., Settimo Vittone (TO) (IT)

( * ) Notice: Subject to any disclaimer, the term of this patent is extended or adjusted under 35 U.S.C. 154(b) by 0 days.

(21) Appl. No.: 14/233,986

(22) PCT Filed: Jul. 19, 2012

(86) PCT No.: PCT/IT2012/000226
§ 371 (c)(1),
(2), (4) Date: Feb. 20, 2014

(87) PCT Pub. No.: WO2013/014690
PCT Pub. Date: Jan. 31, 2013

(65) Prior Publication Data
US 2014/0159268 A1     Jun. 12, 2014

(30) Foreign Application Priority Data
Jul. 25, 2011   (IT) .............................. TO2011A0665

(51) Int. Cl.
*B29C 45/78*     (2006.01)
*B29C 45/27*     (2006.01)

(52) U.S. Cl.
CPC ....... *B29C 45/78* (2013.01); *B29C 2945/76518* (2013.01); *B29C 45/2737* (2013.01); *B29C 2945/76755* (2013.01); *B29C 2945/76254* (2013.01); *B29C 45/2708* (2013.01); *B29C 2945/7604* (2013.01); *B29C 2045/2714* (2013.01)

USPC ..................... 264/40.6; 264/328.15; 425/143; 425/547; 425/548; 425/549

(58) Field of Classification Search
CPC ............... B29C 45/2737; B29C 45/78; B29C 2045/2714; B29C 2945/7604; B29C 2945/76254; B29C 2945/76518; B29C 2945/76755; B29C 45/2708; B29C 2045/274; B29C 45/2701; B29C 2045/2754; B29C 45/30
USPC ................. 425/547–549, 143, 144; 264/40.6, 264/328.14, 328.15
See application file for complete search history.

(56) References Cited

U.S. PATENT DOCUMENTS

| 4,412,805 | A | | 11/1983 | Morrison | |
|---|---|---|---|---|---|
| 4,687,613 | A | * | 8/1987 | Tsutsumi | ................. 264/328.15 |
| 5,219,593 | A | * | 6/1993 | Schmidt et al. | ............... 425/549 |

FOREIGN PATENT DOCUMENTS

| DE | 3740123 | 6/1989 |
|---|---|---|
| JP | 62124921 | 6/1987 |

OTHER PUBLICATIONS

Menges, G. et al. "The Ring Gate," How to Make Injection Molds, Jan. 1, 2000, pp. 208-210, XP002396828, paragraph [06.3].
International Search Report mailed on Oct. 4, 2012, for application PCT/IT2012/000226 filed on Jul. 19, 2012 in the name of Ergotech S.R.L.
Written Opinion mailed on Oct. 4, 2012, for application PCT/IT2012/000226 filed on Jul. 19, 2012 in the name of Ergotech S.R.L.
International Preliminary Report on Patentability mailed on Aug. 7, 2013, for application PCT/IT2012/000226 filed on Jul. 19, 2012 in the name of Ergotech S.R.L.

* cited by examiner

*Primary Examiner* — Jill Heitbrink
(74) *Attorney, Agent, or Firm* — Steinfl & Bruno LLP

(57) ABSTRACT

A system for the injection molding of plastic material is described. The system has an injection device of the hot runner type for the injection of a plastic material, in a molten state, into a mold, a circular diaphragm to distribute evenly and circularly in a cavity of the mold, through a circular injection gate or port, the plastic material injected by the injection device, and control means adapted to control an operation of the molding system an including a heating inductor and heating means provided to heat and keep at a hot temperature the injection device, and a thermocouple being arranged in an area of the circular injection gate. The control means are adapted to control through the heating inductor a molding cycle of a piece. The system is particularly suitable for molding pieces which typically have a form of a solid of rotation with cylindrical outer surfaces, and is configured in an area of the circular injection port so as to avoid a formation of waste or superfluous parts which must be subsequently removed from the piece, once molded.

9 Claims, 8 Drawing Sheets

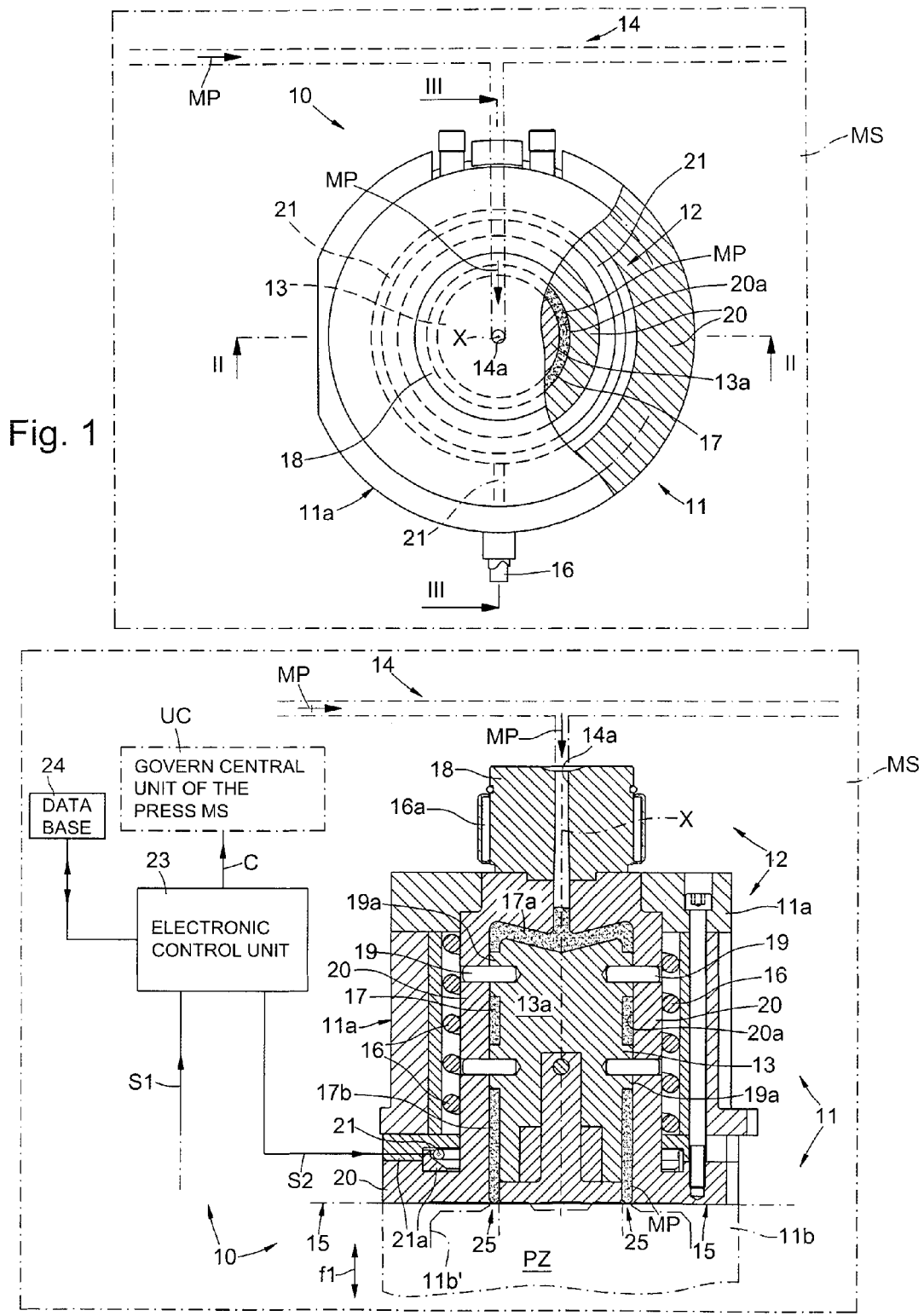

(a) PRIOR ART (b) MOULDING SYSTEM OF THE INVENTION

SYSTEM FOR THE INJECTION MOULDING OF PLASTIC MATERIAL, PARTICULARLY SUITABLE FOR THE MOULDING OF PIECES HAVING THE FORM OF A SOLID OF REVOLUTION OR SIMILAR, AND CORRESPONDING METHOD

CROSS REFERENCE TO RELATED APPLICATIONS

The present application is the US national stage of International Patent Application PCT/IT2012/000226 filed on Jul. 19, 2012 which, in turn, claims priority to Italian Patent Application TO2011A000665 filed on Jul. 25, 2011.

TECHNICAL FIELD

The present invention generally relates to the field of injection moulding of plastic material, and more particularly it relates to a new injection moulding system suitable for being advantageously applied to mould pieces that typically have a shape of a solid of rotation or revolution, i.e. exhibit a configuration and external surfaces with an axial-cylindrical symmetry or the like.

BACKGROUND ART

Currently, the field of injection moulding of plastic material offers numerous technical solutions and systems, widely applied, which have been developed for moulding parts which have a form of a solid of rotation, i.e. exhibit cylindrical and/or conical internal and external surfaces or similar that are extending around and along a central axis of symmetry.

By way of example, FIG. 12 shows a generic piece PZ-100, made of plastic, having justly the shape of a solid of rotation with respect to a central axis X of symmetry, which piece PZ-100 is moulded through a system of injection moulding, of a conventional diaphragm type and indicated generally with 100, that is currently used in the technique.

As can be seen from this FIG. 12, the piece PZ-100 is produced and moulded by injecting the plastic material in the molten state, as shown schematically by an arrow MP, in the cavities of a mould, indicated by 101 and represented schematically with dashed-dotted line, through a conduit or central channel 102, which opens into an injection chamber 103, having the form of a circular disc, which chamber is in turn in communication along its circular periphery with the cavities of the mould 101 which define the shape of the piece PZ-100.

In this way, the plastic material MP is supplied from a central area, corresponding to the channel 102, and is injected and distributed in a regular and uniform form into the cavity of the mould 101 which defines the cylindrical surfaces of the piece PZ-100 to be moulded, i.e. along the entire circular development of such surfaces.

This moulding system 100 is able to ensure a good superficial quality and absence of defects, such as junction lines of the flows of the plastic material, in the cylindrical surfaces which define the shape of solid of rotation of the piece PZ-100.

In fact, as said, the injected plastic material MP accesses to and is distributed in a uniform and circular way along these surfaces, whereby the piece once moulded does not show any signs of confluence and division of the flows of the injected plastic material MP.

However this known moulding system 100 is not exempt from problems, and in particular has the significant drawback that the plastic material MP, which fills the channels for the access to the cavity of the mould 101 and solidifies at the end of the injection phase in the same mould 101, material that constitutes the so-called sprue or feedhead indicated with PZ-100', remains attached to the body of the piece PZ-100, once it has been moulded.

Therefore, this sprue PZ-100' must be properly removed at a later stage after the moulding of the piece, with a consequent increase of the time of production of the finished piece or part and thereby also with a corresponding increase of the cost of production.

It is also felt in the technical field of injection moulding of plastic material, even by taking into account of the rapid evolution that interests this technology, the need to further optimize the various steps and operations that make up and in which the injection moulding technology is divided, as in particular the important and critical operation of injecting the plastic material into the mould, as well as the need to reduce the relative costs.

DISCLOSURE OF INVENTION

In the current technical context, such as briefly outlined above, the inventor has perceived that a more precise and real-time control of the temperature in the zone of the injection of the plastic material into the mould could considerably improve both the overall efficiency of the moulding operation of a piece of plastic material and the quality of the final moulded piece.

Similarly, the inventor has perceived that additional and substantial benefits, both in terms of efficiency and performance of the injection moulding process and of quality of the final moulded products, could be obtained by properly controlling and by taking into account, during the moulding process, and in any case to a greater extent than expected from the solutions currently adopted in the technique, of some specific technical and functional characteristics, as in particular rheological characteristics, of the plastic material that is used to mould the piece.

Therefore a first object, more general, of the present invention is to provide a system, for the injection moulding of plastic material, which is advantageous when compared to the systems now in use, and in particular is capable of overcoming the various drawbacks and going beyond the limits, such as those mentioned above, of the actual technique, so as to meet the needs presently felt in the field of injection moulding of plastic material.

A second object, more particular, is to provide a system for the injection moulding of plastic material which is able to ensure a high superficial surface, virtually free from defects, of moulded parts that typically have a shape of a solid of rotation, maintaining at the same time to a low level the cost of their production.

The above objects can be considered as fully achieved by the system of injection moulding for plastic material having the characteristics defined by the first main independent claim.

Particular embodiments of the system of injection moulding of the invention are also defined by the dependent claims.

The new system for injection moulding of the invention, by virtue of its special features and as will appear from the following description, presents numerous and important advantages, in particular in the moulding of parts having the shape of a solid of rotation, such as those listed herein below purely by way of example:

optimization in real-time of the moulding cycle of the piece, in particular depending on the specific type of the plastic material used for moulding;

no further actions to be made on the piece after its moulding, such as removal or cutting of scrap parts or of the sprue, whereby the piece is finished once moulded;

saving and less waste of plastic material, since all the plastic material injected by the nozzle is used to mould the piece, and what remains, after the injection, in the nozzle heat is used to mould the next piece, whereby there is no formation of any sprue which remains attached to the piece and must be subsequently removed.

BRIEF DESCRIPTION OF DRAWINGS

These and other objects, features and advantages of the present invention will be clear and evident from the following description of some preferred embodiments thereof, given purely by way of example with reference to the accompanying drawings, wherein:

FIG. 1 is a partial and schematic plan view, with some parts removed, of a hot nozzle, having a circular section, of a system for the injection moulding of plastic material, according to the present invention, particularly suitable for moulding parts which have a form of a solid of rotation;

FIG. 2 is a partial and schematic first section, along a corresponding first longitudinal plane defined by the line II-II of FIG. 1, of the system for the injection moulding of plastic material according to the present invention;

Figure 3:
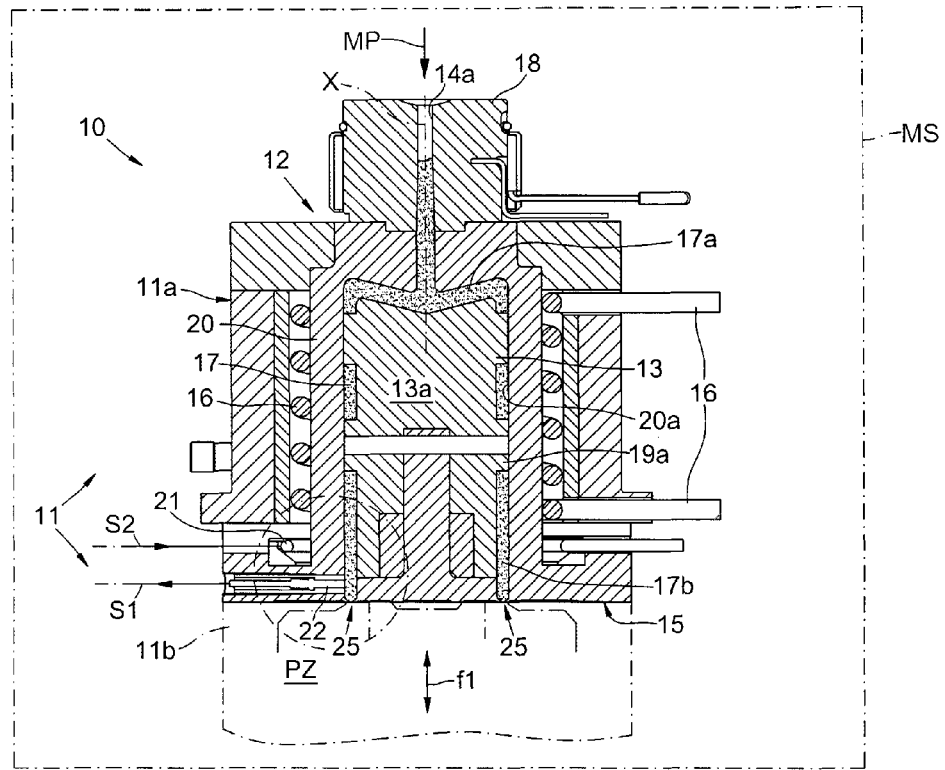
FIG. 3 is a partial and schematic second section, along a corresponding second longitudinal plane defined by the line III-III of FIG. 1.
Figure 4:
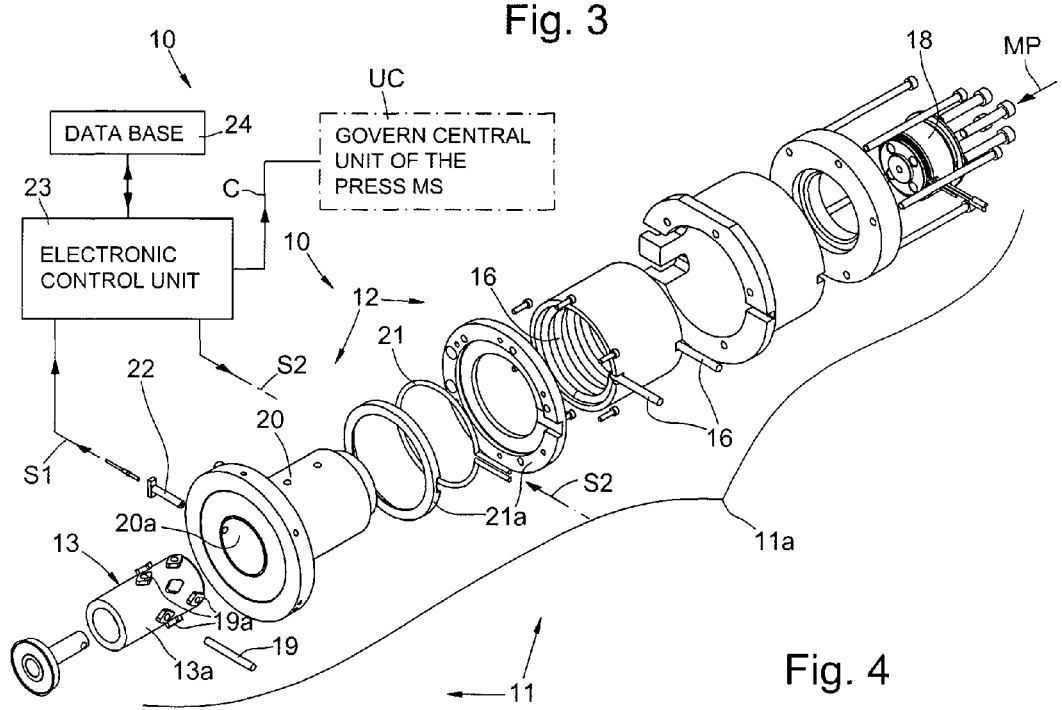
FIG. 4 is a schematic and partial view, in exploded perspective form, of the injection moulding system of the invention of FIGS. 1-3.
Figure 5:
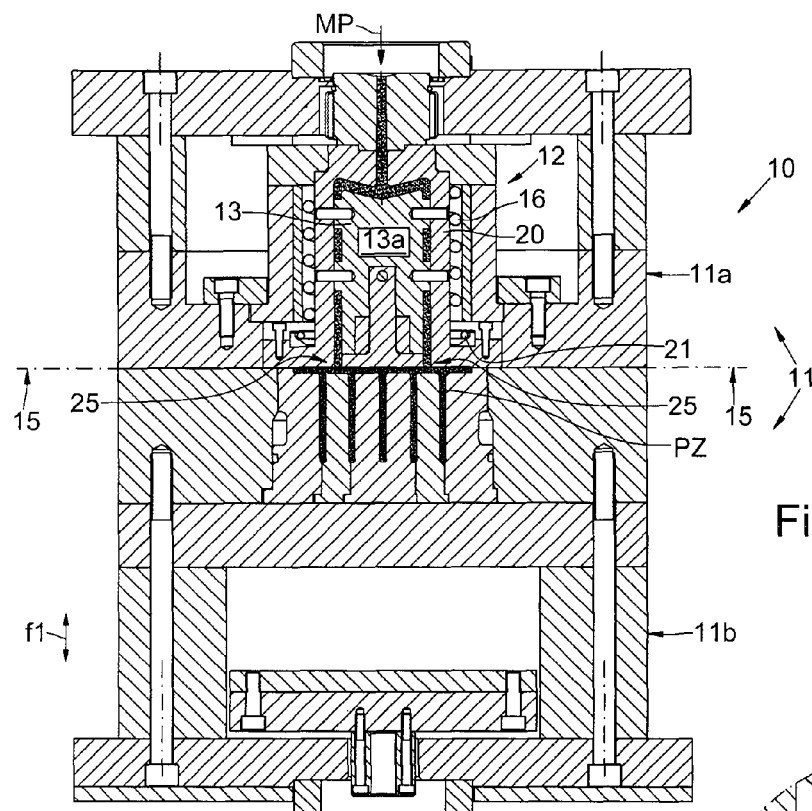
FIG. 5 is a third section of the injection moulding system of the invention of FIGS. 1-4, still along a longitudinal plane and including both the fixed and the movable part of a mould in which the injection moulding system is incorporated.

DETAILED DESCRIPTION OF A PREFERRED EMBODIMENT OF THE SYSTEM FOR INJECTION MOULDING OF THE INVENTION

With reference to the drawings, a system for the injection moulding of plastic material, made in accordance with the present invention, is generally indicated with 10.

The moulding system 10 of the invention is typically suitable to be integrated into and be part of a more general equipment, machine or moulding system, also simply called press, indicated with MS and only schematically shown in the drawings, for the injection moulding of a plastic material MP.

As it will be understood better in the following of the description, this moulding system 10 is particularly, though not exclusively, suitable and advantageous to mould pieces of plastic material having a shape of a solid of rotation or exhibiting a rotational symmetry, i.e. having an external form, cavities and axial holes, through or not, which are defined by surfaces generally cylindrical, conical or similar, with these surfaces developing and extending generally around and along a central axis of symmetry.

More in detail, as shown in FIGS. 1-6 of the drawings, the moulding system 10 of the invention comprises:
  a mould, generally indicated with 11 and consisting of a respective fixed part 11a and a respective movable part 11b, divided by a plane of division or separation 15, wherein the movable part 11b is adapted to move relative to the fixed one 11, as indicated by a double arrow 11;
  a device or injection nozzle 12, which is associated with the fixed part 11a of the mould 11 and extends in such fixed part 11a along an axis X;
  a circular diaphragm 13, also associated with the fixed part 11a of the mould 11 and extending along the axis X.

The injection device 12 is, for example, associated with a system of distribution and supply of the hot runner type, generally indicated by 14 and only partially and schematically represented in the drawings, wherein this system comprises a plurality or network of respective channels which have the function of distributing and supplying the plastic material MP, shown schematically in the drawings by an arrow, to the injection device 12.

Moreover these channels are kept constantly at a hot temperature so as to maintain over time in the fluid state the plastic material MP that flows in them in order to supply the injection device 12 and then to be injected into the cavity 11b' of the mould 11, where the plastic material MP forms a moulded part, designated generally by PZ.

In particular, as shown in the drawings, the hot runner distribution and supply system 14 comprises a main hot runner 14a which extends, along the X axis, through the injection device 12 and is an integral part of it.

Both the various channels of the distribution and supply system 14 and the main hot runner 14a which extends along the X axis of the injection device 12 are associated with heating means, of conventional type and constituted for example by one or more electrical resistors shaped as a winding or the like, which have the specific function to keep them constantly hot at a given temperature.

In particular, as shown in FIGS. 2 and 3, these heating means comprise an electrical resistance having a spiral shape, or of other type, indicated with 16, which is incorporated in the fixed part 11a of the mould 11 and is wrapped around a tubular body having a flange, or flanged sleeve, indicated with 20, of the injection device 12.

Furthermore, these heating means comprise a heating band 16a which is arranged around a cylindrical body 18, belonging to the fixed part 11a of the mould 11, inside which body the main hot runner 14a extends along the X axis.

As it is well known in the technology of injection moulding, the distribution and supply system 14, since being of the hot runner type, implies that the plastic material MP, which is supplied to the injection device 12 in order to be injected into the mould 11, is typically and preferably consists of a thermoplastic resin, i.e. a resin which, when heated, simply tends to become viscous and fluid so as to be injectable and thereby adapted to form the moulded piece, but without undergoing any chemical reaction such as to change its essential characteristics.

It is noted that in this case the plastic material MP, or the thermoplastic resin, used to form and mould a piece, has the significant advantage of being adapted to be reground and reused in order to form and mould another piece.

The circular diaphragm 13 is constituted by a cylindrical body 13a which extends along the X axis, in the fixed part 11a of the mould 11, adjacent to the plane of division 15 between the respective fixed part 11a and movable part 11b, wherein this cylindrical body 13a is housed in a compartment 20a, which is formed by the flanged sleeve 20 of the injection device 12.

Moreover, the circular diaphragm 13 is rigidly secured to the sleeve 20 of the fixed structure 11a of the mould 11 by means of a plurality of plugs and screws 19.

In this way, the sleeve 20 of the injection device 12 and the circular diaphragm 13 define jointly, in the fixed part 11a of the mould 11, a cavity 17, for the passage of the plastic material MP, which cavity 17 is formed by a circular portion 17a that is arranged at the exit of the main hot runner or channel 14a, and by a cylindrical portion 17b that is adjacent to the circular portion 17a and develops around and along the axis X.

In particular, this cavity 17 has the function of receiving and conveying the plastic material MP, in the molten state, which is supplied to and is injected by the injection device 12 towards the cavity 11b', of the mould 11, which is formed inside the respective movable part 11b and defines the specific shape of the piece PZ to be moulded.

Suitable projections 19a are formed along the outer cylindrical surface of the body 13a of the circular diaphragm 13, in particular in the zone of the fixing pins 19, in order to convey the molten plastic material MP while flowing along the cylindrical portion 17a of the cavity 17.

Still, the outer sleeve 20 and the body 13a of the circular diaphragm 13 define, in the region of the division plane 15, an opening or circular port or gate 25, through which the plastic material MP, injected by the injection device 12 and conveyed and distributed by the circular diaphragm 13, accesses to the cavity 11b' of the mould 11 defining the piece PZ to be moulded.

The piece PZ to be moulded, in turn, shows, as before mentioned, typically a configuration of a solid of rotation, namely an outer shape that is defined by cylindrical surfaces, conical and/or the like, that are developed symmetrically about the axis X, whereby also the various cavities of the movable part 11b of the mould 11, which define the external shape of the piece to be moulded, have a corresponding configuration of a solid of rotation about the axis X.

Therefore, the cavity 17, due to its cylindrical and symmetrical configuration with respect to the axis X and to the main injection channel 14a, as described above, is adapted to receive from the main injection channel 14a the plastic material MP that is injected by the injection device 12 and to distribute the plastic material MP in a circular and uniform way, about the axis X, in the various cavities that are formed in the movable part 11b of the mould 11 and define the shape and external surfaces of the piece PZ to be moulded.

It also follows, since the plastic material MP is injected and distributed evenly around the X axis in the inner cavities of the movable part 11b of the mould 11, that the piece PZ, once moulded, does not exhibit along its cylindrical or similar surfaces, that define its external configuration of a solid of rotation, signs or traces of confluence and flow separation of the injected plastic material.

Of course, the configuration of the injection device 12 and the respective circular diaphragm 13 depend on the specific shape of the piece to be moulded, whereby also the configuration of the cavity 17, as described above, formed by the two portions 17a and 17b, is to be considered merely as an example, without any limiting value.

According to a feature of the present invention, the injection moulding system 10 further includes innovative control means adapted to control in real time the injection phase of the plastic material MP, in the molten state, into the mould 11 to form the piece, wherein these means control in turn include:

- a heating inductor 21, adapted to be driven in frequency, which is provided additionally and separately from the heating means 16, of conventional type and before described, having the function of keeping constantly warm the channels of the distribution and supply system 14 of the injection device 12, wherein this heating inductor 21 is arranged in the area of the circular diaphragm 13, and more specifically in the area of the separation plane 15 between the fixed part 11a and the mobile part 11b of the mould 11;
- a thermocouple or temperature sensor, indicated with 22, for detecting the temperature in the area of the circular diaphragm 13; and
- an electronic control unit 23, shown schematically in the drawings, which is adapted to receive, from the thermocouple 22, a signal S1 indicative of the temperature in the region of the circular diaphragm 13, and to cooperate with a data base 24, also shown schematically in the drawings, in turn containing a variety of data and information regarding the characteristics, in particular physical and rheological, of the plastic material that is used to mould the piece.

The heating inductor 21 is embedded in the fixed part 11a of the mould 11, between two rings 21a which have the function of isolating the heating inductor 21 from the rest of the structure.

Figure 6:
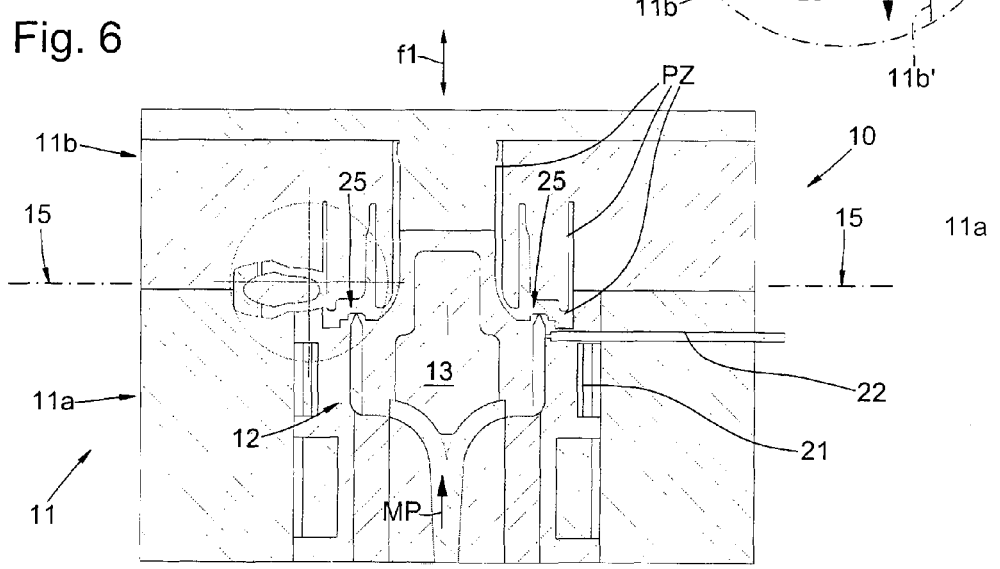
FIG. 6 is a detailed section of the system for the injection moulding of the invention in the area of division between the fixed and movable parts of a mould.

For clarity, FIG. 6 shows in more detail the mould 11, in the area of the plane of division 15 between the respective fixed part 11a and the movable part 11b, and clearly shows how the heating inductor 21 and the thermocouple 22 are arranged, in that area, adjacent to the circular gate 25, through which the plastic material MP, injected by the injection device 12 and conveyed and distributed by the distribution circular diaphragm 13, accesses to the cavity of the mould 11 defining the piece PZ to be moulded.

Figure 3A:
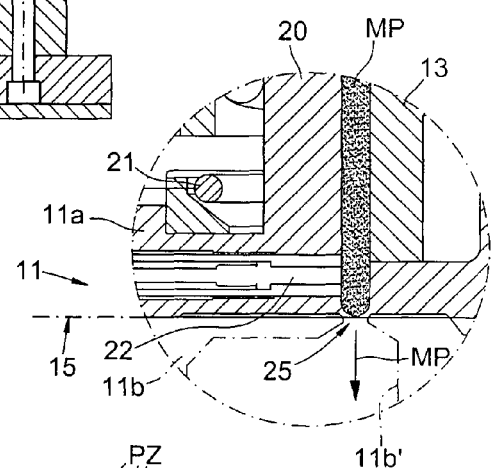
FIG. 3a is a view in enlarged scale of the circular area of injection, indicated by a dashed-dotted circle in FIG. 3, of the moulding system of the invention.

The region of this circular opening or gate 25, also called circular region of injection, is also shown in detail in FIG. 3a.

The electronic control unit 23 in turn, as also better described in the following, has the function of controlling, via the heating inductor 21 and by taking into account both of the temperature sensed by the thermocouple 22 and of the information contained in the data base 24, the temperature in the region of the circular diaphragm 13, adjacent to the separation plane 15 between the fixed part 11a and the mobile part 11b of the mould 11, so as to keep under control in real time the moulding operation of the piece PZ, and in particular to ensure its correct formation, as well as a regular detachment of the piece PZ, once moulded, from the fixed part 11a of the mould 11.

The electronic control unit 23 is also adapted to cooperate and to exchange signals with a govern central unit, or central control unit, shown schematically in the drawings and indicated with UC, which is used to govern the general operation of the machine or moulding system MS in which the moulding system 10 of the invention is integrated.

At last it should be noted that, for reasons of synthesis, the drawings show a single nozzle with a corresponding injection device 12 associated with the mould 11, being however understood that other embodiments, yet within the scope of the invention and including more nozzles and more injection devices associated with the same mould, are possible.

Operation of the Injection Moulding System of Plastic Material of the Invention

Figure 7:
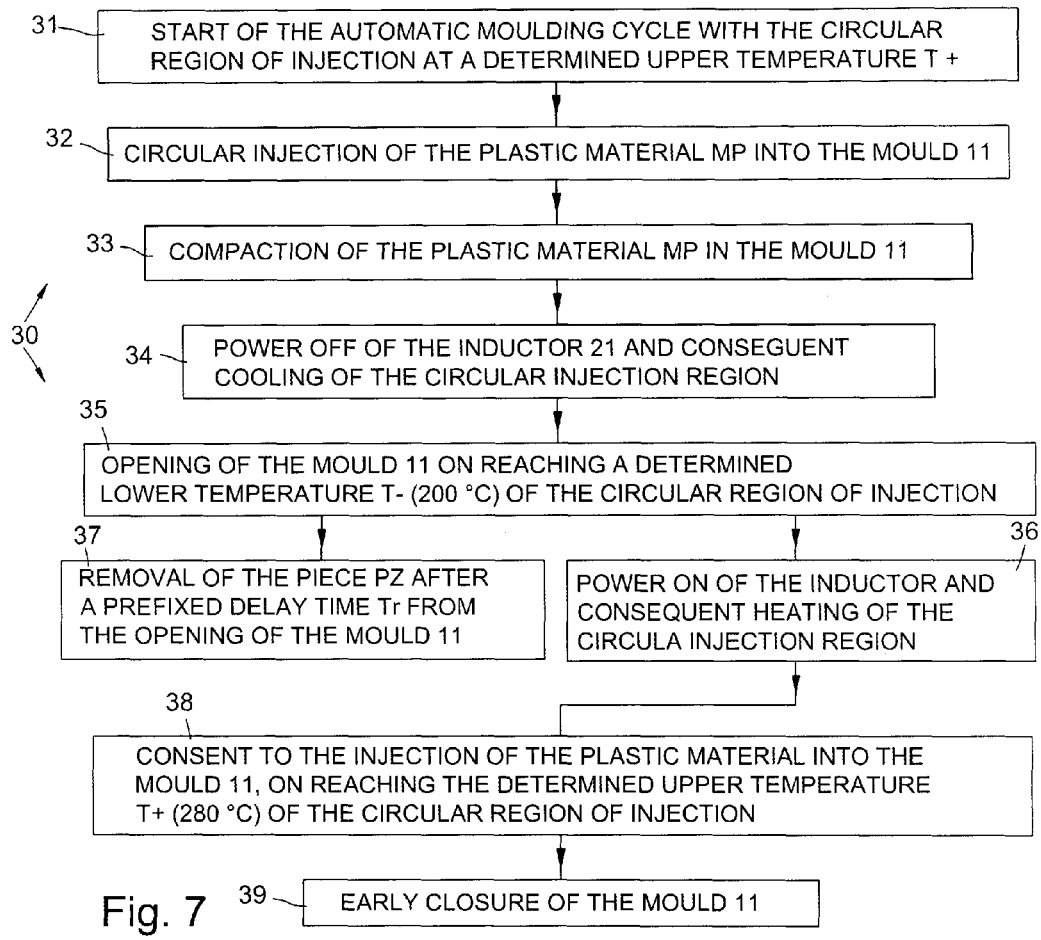
FIG. 7 is a flow diagram, in block form, illustrating the operation of the system for the injection moulding according to the present invention.
Figure 8:
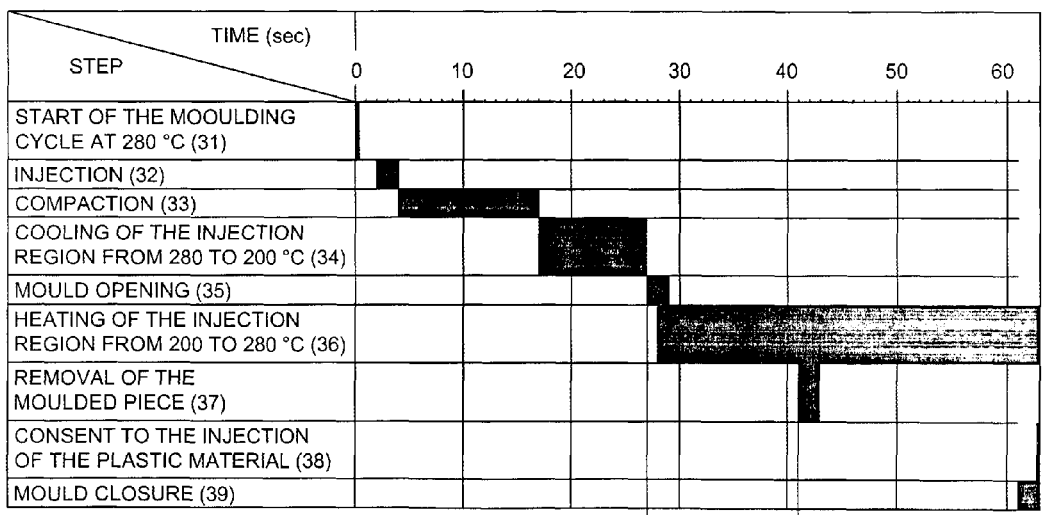
FIG. 8 is a diagram illustrating the time sequence of the various phases of a moulding cycle carried out with the injection moulding system of the present invention.

With reference to FIGS. 7 and 8 it will now be described the operation of the injection moulding system 10 of plastic material according to the present invention.

The operation of the moulding system 10 typically comprises a plurality of injection moulding cycles, substantially equal, indicated with 30 and each corresponding to the flowchart of FIG. 7 and to the timing diagram of FIG. 8, which cycles occur one after other to mould at each moulding cycle one or more pieces PZ of plastic material MP.

Each moulding cycle 30 is started automatically, as indicated by a start block 31, in a condition in which the circular region of injection, i.e. the region adjacent to the circular opening or gate 25, is at a given upper temperature indicated with T+, for example of approximately 280° C.

At the start of the moulding cycle and as indicated by a step 32, the moulding machine or press MS, in which the system 10 is integrated, controls the injection of the plastic material MP, in the molten state, into the mould 11, in order to fill its cavity 11b'.

Therefore, in this injection phase 32 and as shown in FIG. 3a, the molten plastic material MP is injected into the mould 11 by passing through the circular gate 25, so as to be distributed uniformly and in a circular manner along the internal cavity 11b' formed within the movable part 11b of the mould 11.

Then, in a compaction step 33, associated with the injection step 32, the plastic material MP is compacted within the mould 11, in a known way and as determined by the moulding machine MS, while the heating inductor 21 maintains constant and at the required level the temperature of the injection gate 25.

In this way it is ensured both the correct and complete filling of the mould cavity and the compaction by pressure of the plastic material, in such mould cavity, for the time necessary to achieve the desired density.

Later, at the end of the compaction stage 33, the inductor 21 is immediately turned off, so that the circular injection area adjacent to the gate 25 cools during a corresponding cooling step 34.

This cooling may occur in a natural way, i.e. by leaving the heat being dissipated by itself through the circular injection area, or may be accelerated by a suitable cooling circuit, using a fluid heat-carrier gas or liquid, or by similar cooling means, not shown in the drawings, which are arranged in such a circular injection area.

The cooling of this circular area of injection is constantly monitored by the control unit 23, on the base of the signal S1 received from the thermocouple 22, and, when the respective temperature is lowered to reach a given temperature indicated with T−, for example of about 200° C., lower than the above determined upper temperature T+, the control unit 23 immediately sends a signal to the central unit UC, governing the general operation of the moulding machine MS, which in response to that signal commands the opening of the mould 11, during a corresponding opening step or phase 35.

In particular it is noted how in this phase, owing to the special circular configuration of the system 10, as defined by the circular diaphragm 13 and the port 25, for distributing and injecting the molten plastic material MP into the mould 11, the moulded part that is detached and separates, along the plane 15, from the fixed part 11a of the mould 11 and is contained in the mobile part 11b, corresponds to the piece PZ in its final form.

In other words the part that is detached and separates, along the plane 15, from the fixed part 11a of the mould 11, jointly with the movable part 11b, does not bear attached superfluous parts such as a sprue, whereby the piece PZ does not require, once moulded, further processing or operations, such as in particular the removal of sprue, scraps and other waste parts.

At this point the operation of the moulding system 10 provides that the electronic control unit 23 controls, via the signal S2, the inductor 21, in order to heat by means of the latter the circular injection area adjacent to the gate 25, during a corresponding heating step 36, and thereby to return again it to the determined upper temperature T+, equal to 280° C.

Then, after opening of the mould 11, the moulding machine or press MS 10 waits for a predetermined period of time, or delay time Tr, that can be defined as a remaining cooling time of the piece PZ, before carrying out the extraction of the piece PZ from the mould 11 during a corresponding extraction step 37.

During the heating step 36 subsequent to the opening of the mould 11, the control unit 23 constantly monitors, by analyzing the signal S1 received from the thermocouple 22, the increase in temperature, determined by the inductor 21, in the circular area of injection, and when such temperature reaches the determined upper temperature T+ generates, as indicated by a step 38, a signal C of consent which is sent to the central control unit UC to enable it to inject the plastic material MP into the mould 11, during the following moulding cycle 30.

Moreover, the moulding machine MS activates the closure of the mould 11a bit of time in advance, corresponding to the time necessary to close the mould 11, with respect to the end of the heating phase 36, Then, once the mould 11 is closed and the heating phase is ended, with the consequent generation and sending by the control unit 23 of the consent signal C to the moulding machine MS for the injection of the plastic material MP, a new moulding cycle, similar to that described above, can begin to mould a new piece PZ.

Alternatively, the consent at the beginning of a new injection, or of a new cycle, can be given by the control unit 23, also with the mould being closed, while waiting for the desired temperature.

The timing diagram of FIG. 8 has the purpose of providing some numerical values, for guidance only, on the duration of the various phases that follow one another in a typical cycle of injection moulding, such as that described above with reference to the flowchart of FIG. 7, carried out through the system 10 of the invention.

For example, considering however that the indicated values depend both on the type of polymer and/or compound that is used and on the thickness of the moulded part, the duration of each of these phases or steps can be:

injection step of the plastic material into the mould: 2 seconds;
compacting step by pressure of the plastic material: 15 seconds;
cooling step of the circular region of injection from 280° C. to 200° C.: 10 seconds;
delay time Tr successive to the opening of the mould, before removing the moulded piece PZ: 15 seconds;
heating time of the injection zone from 200° C. to 280° C.: 35 seconds.

Therefore, with the above values, the total time of the moulding cycle of a piece PZ, exhibiting a usual thickness, is equal to approximately 55-65 seconds.

Figure 9:
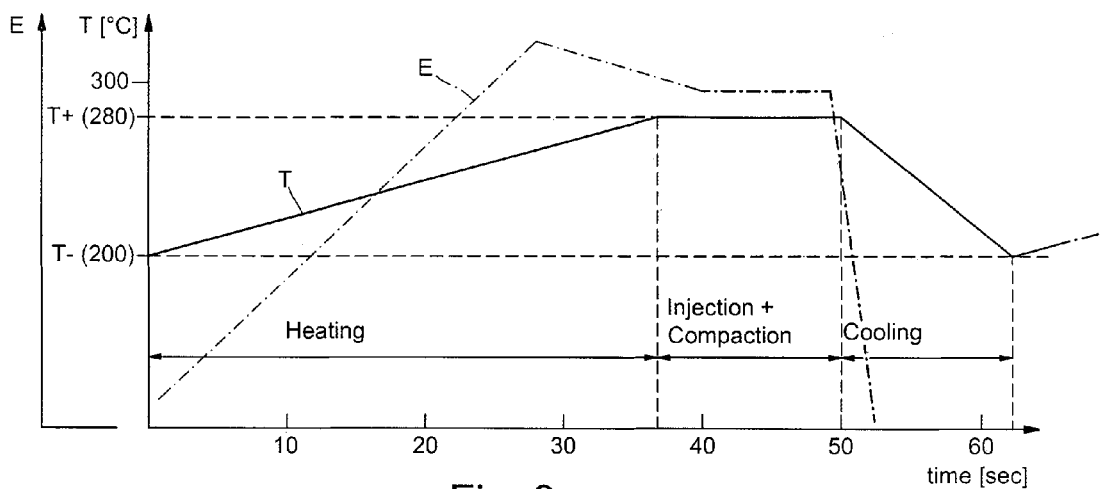
FIG. 9 is a diagram that shows the trend over time of some operating parameters of the injection moulding system of the present invention.

Furthermore, as integration of the diagrams of FIGS. 7 and 8, the diagram of FIG. 9 illustrates the trend, during the evolution of the moulding cycle of the piece PZ, of the temperature T in the circular region of injection, i.e. in the vicinity of the gate 25, and of the power consumption by the moulding system 10.

As can be seen, the temperature T of the circular region of injection varies, during a moulding cycle, between the two extremes T− and T+, equal for instance as before said respectively to 280° C. and 200° C., while the electrical absorption E, i.e. the electric energy that is absorbed per unit of time by the moulding system 10 and mainly by the inductor 21, obviously depends on the particular stage of the moulding cycle, reaching a maximum peak during the heating phase, and tending to become null in the cooling phase.

As already mentioned, according a feature of the moulding system 10 of the present invention, the control unit 23 is associated and is adapted to cooperate with a database 24 containing a plurality of data and information concerning the characteristics and properties of various types of plastic material MP that can be used to mould the pieces PZ.

Furthermore, the control unit 23 is adapted, by querying the database 24, to determine, depending on the specific type of the plastic material MP used to mould the pieces PZ, times, temperatures and other relevant parameters that are used to characterize and control the moulding cycle of the pieces PZ that are moulded with this specific plastic material MP.

For example, the control unit 23 determines the value of the determined upper temperature T+ and that of the determined lower temperature T−, at which values the circular area of injection, adjacent to the gate 25, is heated by the inductor 21 and subsequently cooled or allowed to cool, during the moulding cycle of each piece PZ.

Still, the control unit 23, by querying the database 24 and then by taking account of the specific type of plastic material MP used, or on the basis of data set directly by the operator, according to a variant of the system described later, is provided for cooperating with the central control unit UC of the moulding machine, in which the MS system 10 is integrated, in order to control and condition the times, as indicated in the timing diagram of FIG. 8, of the various stages of injection, compaction, opening of the mould, extraction of the piece from the mould, closing of the mould, and also to give appropriate signals of consent for the same central unit UC.

Therefore, in the injection moulding system 10 of the invention, the values of the temperature of the area of injection during each moulding cycle, as well as the times of the various phases that define the moulding cycle of the piece PZ, can vary significantly depending on the type of plastic material that is used for moulding the same piece PZ and on the piece geometry.

Figure 10A:
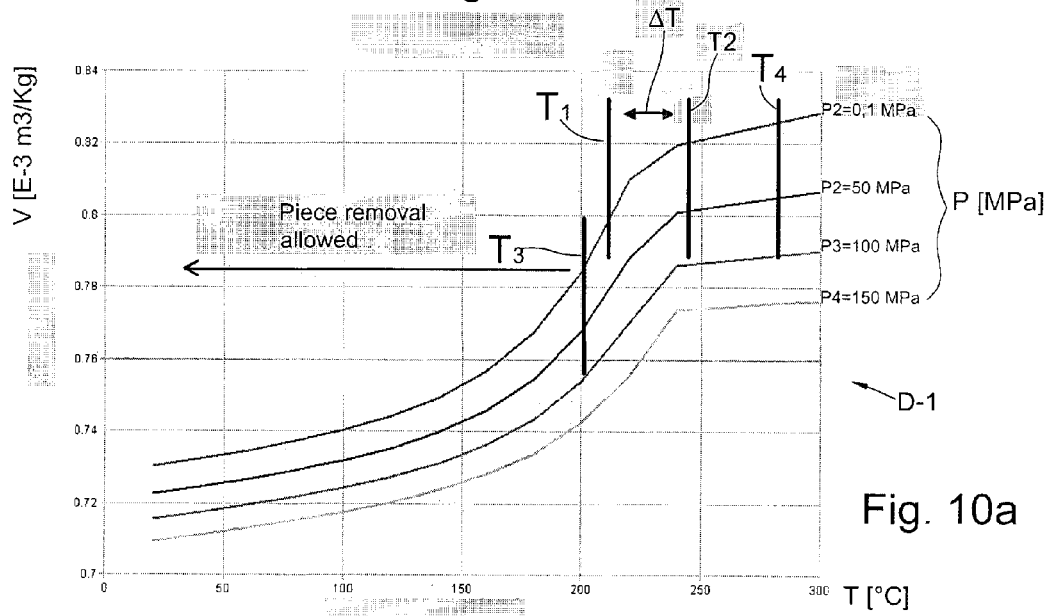
FIGS. 10a and 10b are diagrams relating to characteristics of plastic materials that are used in the injection moulding system of the invention.
Figure 10B:
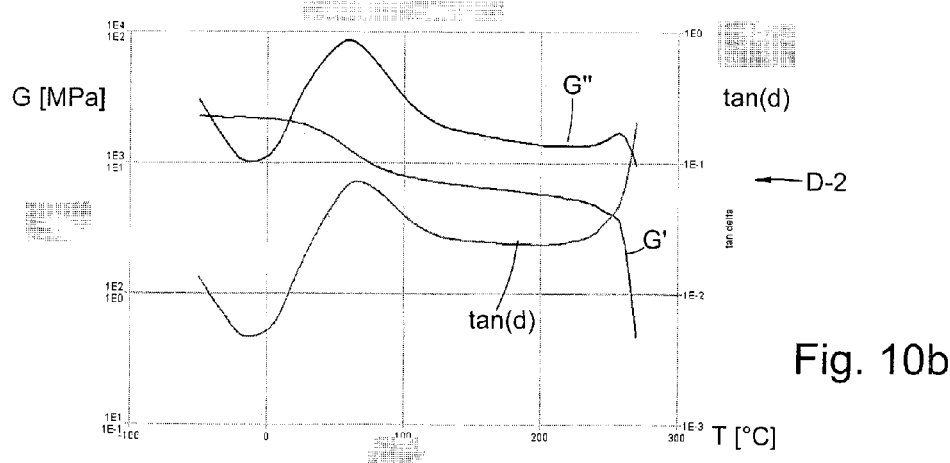

In order to give a more complete information on this important aspect of the invention, the diagrams of FIGS. 10a and 10b represent an example of data and information, contained in the database 24, which are used by the control unit 23 to set, depending on the specific plastic material MP that is used, the parameters of the moulding cycle of the piece PZ and for controlling the evolution of this cycle.

For example, the diagram D-1 of FIG. 10a is a typical temperature-pressure-volume diagram that shows the relationship between pressure P expressed in [MPa], specific volume V, expressed in [E-3 m3/kg], and temperature T expressed in [° C.], of a thermoplastic material of the semi-crystalline type, such as a polyamide reinforced with glass fiber.

In particular this diagram D-1 shows the relationship existing between the specific volume V and the temperature, as a function of a plurality of values P1, P2, P3 and P4 of the pressure P, and specifies the temperature range, indicated with ΔT, between the temperatures T1 and T2, in which the portion of crystalline material undergoes the transition from solid state to fluid state and vice versa.

Furthermore, the same diagram D-1 shows the maximum core temperature, indicated with T3 and approximately equal to (T1-20° C.), of a piece that is moulded with this specific plastic material, i.e. with this polyamide reinforced with glass fiber, at which temperature it is possible to extract the piece from the mould.

Still the diagram D-1 of FIG. 10a specifies the temperature T4 of the plastic material in the molten state at which temperature it is possible to mould the plastic material.

The diagram D-2 of FIG. 10b regards other features and parameters, even concerning the reinforced polyamide referred to by the diagram of FIG. 10a, and in particular shows the relationship existing between the components G', G" and tan(d), that define the dynamic shear modulus G, expressed in [MPa], indicative of the rheological and mechanical properties of the plastic material when subjected to stresses and deformations, and the effective temperature T, expressed in [° C.], that is present in the same plastic material.

Therefore, when the plastic material MP used to mould the pieces PZ is justly constituted by the reinforced polyamide corresponding to the data and information of the diagrams of FIGS. 10a and 10b, the electronic control unit 23 controls in real time the trend and the evolution of the moulding cycle of the piece PZ on the basis of such data and information, stored in the data base 24, that specify the properties and characteristics of the polyamide reinforced with which the piece PZ is moulded.

In particular, on the basis of these diagrams and information that correlate the characteristics of the reinforced polyamide with the effective temperature existing in it, the electronic control unit 23 sets the determined upper temperature T+ and the determined lower temperature T− that define the field within which the temperature T of the circular area of injection, i.e. the region of the circular opening or gate 25, must vary during a moulding cycle.

Moreover, on the basis of these values, thus set, of the temperature in the circular area of injection, the same control unit 23 controls constantly and in real time the evolution of each moulding cycle.

In this way, i.e. by taking into account of the characteristics and properties of the specific plastic material MP which is used, the system of injection moulding 10 of the invention allows to obtain the best results both in terms of efficiency in the moulding step and in terms of quality the final moulded piece PZ.

Of course, in addition to the diagrams of FIGS. 10a and 10b, further data and information, for example concerning thermodynamic transformations, changes of state and more properly mechanical features, such as diagrams of the stress-strain type and/or indicative of the change of the longitudinal modulus of elasticity as the temperature varies, as well as other data, here not described in detail for reasons of synthesis, concerning characteristics and properties of plastic materials intended to be used in the moulding system 10 to mould the pieces PZ, can be contained and stored in the data base 24 so as to be used by the control unit 23 in order to control in real time the moulding cycle of the pieces PZ.

Therefore, in summary, the information contained in the data base 24 allows the moulding system 10 of the invention to control, via the inductor 22, i.e. by holding constantly under control in real time the temperature in the area of the injection gate 25, the various steps of the moulding cycle, in an optimum manner and depending on the specific plastic material MP, amorphous, mesomorphic, semi-crystalline and/or composite, used to mould the pieces PZ, thereby controlling also the manner and timing in which such specific plastic material MP changes from the molten or liquid state, in which is injected into the mould 11, to the solid state, in which it is extracted from the latter, once the piece PZ has been moulded.

Figure 11A:
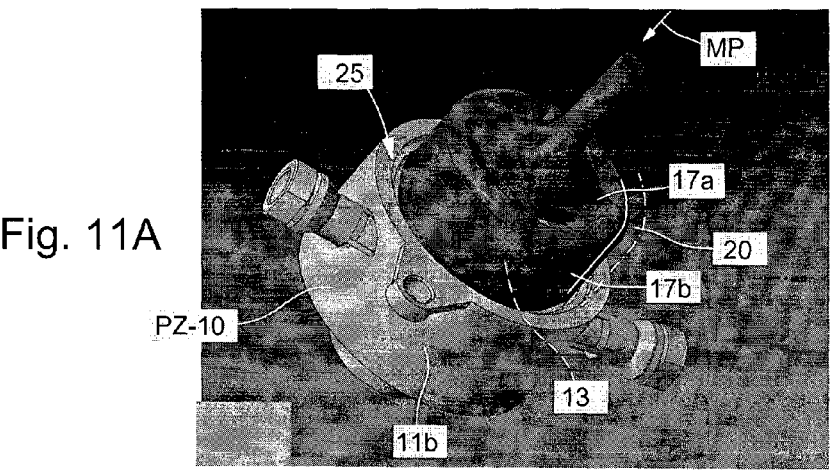
FIGS. 11A and 11B are two perspective views of a typical piece, shaped like a solid of rotation, which is moulded through the injection moulding system of the invention, seen respectively from the injection side of the molten plastic material and from the opposite side.
Figure 11B:
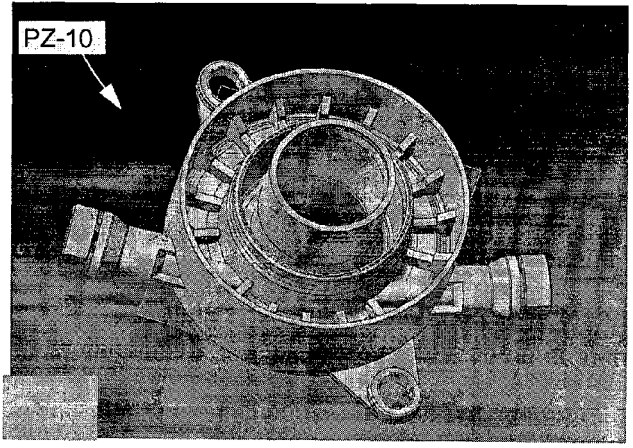
Figure 12:
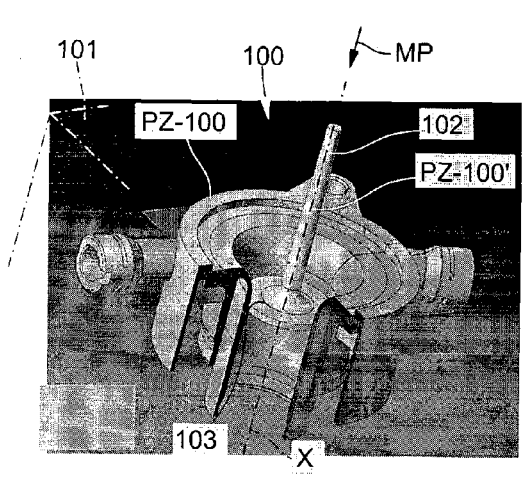
FIG. 12 is a perspective view of a piece, shaped like a solid of rotation, moulded by means of a conventional moulding system.

To complete the above description, FIGS. 11A and 11A show from two opposite points of observation a significant example of a piece of plastic material, indicated with PZ-10 and exhibiting a typical form of a solid of rotation, which is moulded with the injection moulding system 10, according to the present invention.

Figure 13:
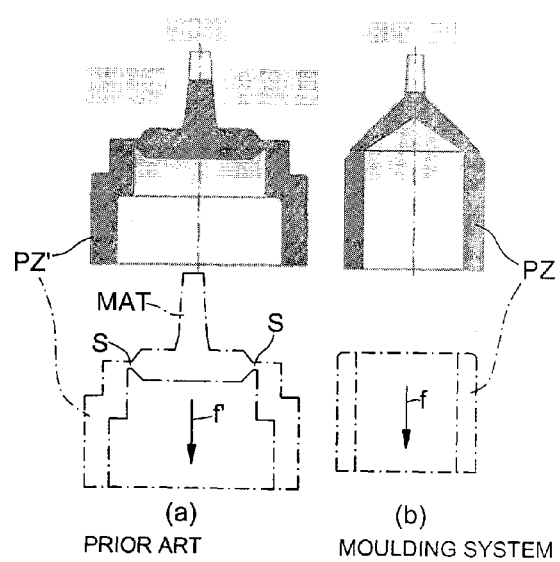
FIG. 13 is a diagram that compares synthetically a piece of plastic material, typically having the shape of a solid of rotation, moulded through the new system for injection moulding according to the present invention, and a similar piece, i.e. having still a form of a solid of rotation, that instead is moulded through a system of injection moulding according to the conventional technique.

Again, for clarity and in order to further highlight the distinctive features of the present invention, FIG. 13, composed of the sections (a) and (b), schematically compares a piece, indicated with PZ and having a typical shape of a solid of rotation, which is moulded through the injection moulding system 10 of the invention, as described above, and a piece, indicated with PZ' and also having a typical form of a solid of rotation, which is moulded instead through an injection moulding system according to the conventional technique.

As can be seen clearly from FIG. 13, the piece PZ, once moulded with the new injection moulding system 10 of the invention and extracted from the mould, as indicated by an arrow f, is practically finished, i.e. is in and exhibits its final and definitive configuration, without the need of removing any sprue or other superfluous part from the piece PZ one moulded.

In other words, the moulding system 10 allows to mould directly "in the figure," without having to provide for a sprue or similar parts which need to be removed after moulding.

Instead the piece PZ', once moulded by the conventional moulding system and extracted from the respective mould, as indicated by an arrow f', has a central part MAT, corresponding to the sprue, which is still attached to the body of the piece PZ', whereby this part or sprue MAT must be separated and removed by cutting it along a separation zone S with respect to such body, at a later stage after the moulding of the piece PZ'.

Variants

Of course, without prejudice to the principle and basic concepts of the present invention, the embodiments and the details of construction of the system for the injection moulding of plastic material, proposed here, may be widely varied with respect to what has been described hitherto and illustrated, without thereby departing from the scope of the same invention.

For example, the moulding system of the invention can be applied not only on a mono-cavity mould, but also on a mould of the multi-cavity or multi-site type, designed for the moulding at the same time of a plurality of pieces having the same or different form.

Again, the injection port or gate, rather than presenting a continuous circular shape, such as the injection port 25 before described, may be divided into several sectors or arcs, in order to define and form corresponding flows of plastic material, in turn intended to feed respective cavities of the mould for the moulding at the same time of several pieces.

Furthermore, as alternative to the contact thermocouple 22, an infrared ray device IR can be adopted to detect the temperature in the area of the circular injection gate 25.

According to another variant, the electronic control unit of the moulding system of the invention can be configured so as to be adapted to make calculations of different complexity and to require different ways of setting.

For example, in accordance with a first embodiment, substantially corresponding to the above described preferred embodiment, which appears more complex with regard to the execution of calculations but more automatic in its setting and use, the moulding system of the invention may be associated with a database that contains already stored the information on the physical and rheological characteristics of a wide range of plastic materials potentially usable to mould the pieces.

In particular, data relating to the characteristics of plastic materials, stored in the database of the system, can be part and consist of libraries of data provided directly by the suppliers of materials.

In this first embodiment, the operator has only in practice to set the selected material to use for moulding the piece PZ, since the system will be able to automatically calculate the optimal values and the most appropriate parameters under which keep under control in real time the various step of the moulding cycle, and in particular the temperature range between T− and T+ within which the injection port or gate 25 must operate during moulding of the piece PZ.

Alternatively, in accordance with a second embodiment less sophisticated and thereby less automatic than the first one, but requiring a greater interaction with the operator, the data relating to the physical and rheological properties of plastic materials to be used to mould the pieces are not stored in the database system.

In this case, the operator must first establish, in an evaluation or design phase, which is the plastic material more appropriate to use for moulding the piece PZ, i.e. select the plastic material among the many possible, in particular by analyzing the physical characteristics and rheological properties of these materials and using the documentation provided by the respective suppliers.

Then the operator sets and introduces in the control unit of the moulding system values and data corresponding to the characteristics of the plastic material that has been chosen, of the parameters to be monitored, and in particular the temperature range between T− and T+ within which the injection port 25 must operate, whereby the control unit of the system will check in real time, on the basis of the data and the values set by the user, the various steps of the moulding of the piece.

In addition, both the two embodiments described above, characterized respectively by a major and minor level of automation, can comprise and implement functions which allow the operator to define the size and geometry and the thickness of the piece to be moulded, and thereby determine on the basis of these data the moulding process.

Figure 14A:
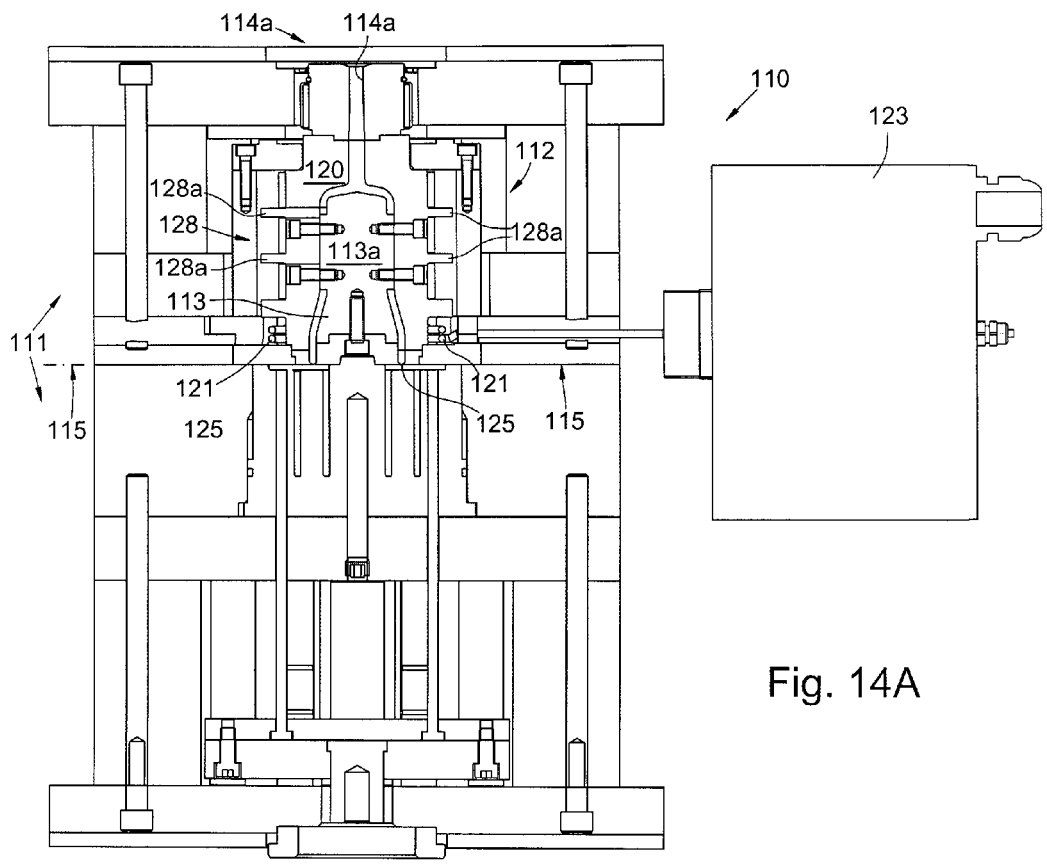
FIGS. 14A and 14B are two partial and schematic sections, along longitudinal planes perpendicular to each other, of a variant of the system for the injection moulding of plastic material according to the present invention.
Figure 14B:
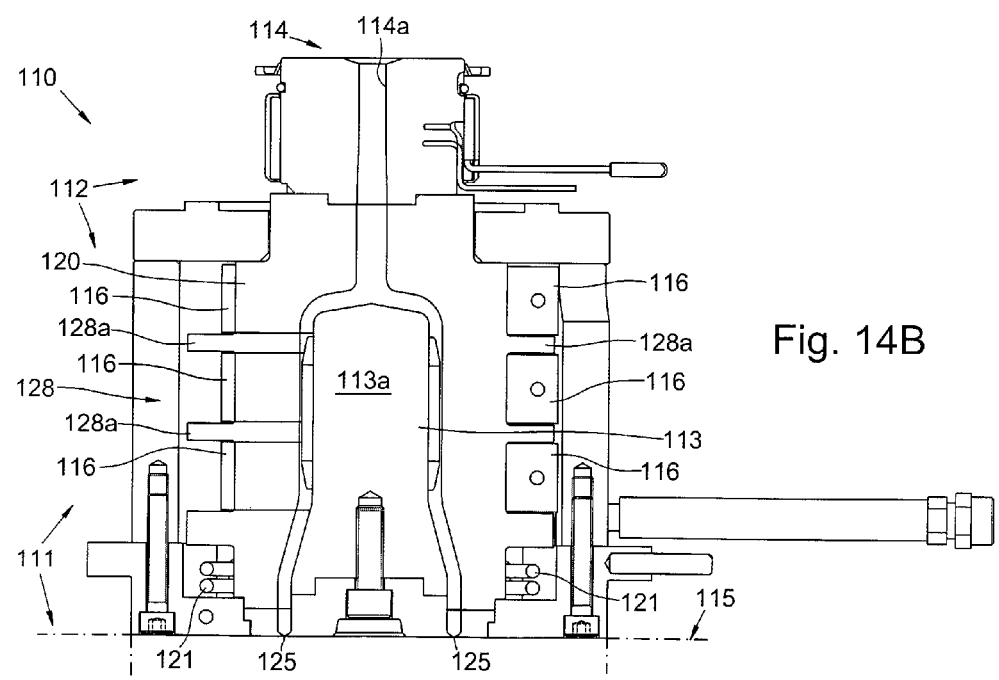

FIGS. 14A and 14B show a constructional variant, designated by 110, of the moulding system of the invention, wherein the parts corresponding to those of the embodiment 10, before described, are indicated with reference numerals incremented by 100.

This variant 110 differs from the moulding system 10 essentially in the shape of the sleeve 120 which houses the circular diaphragm 113 and is provided, on the outer cylindrical surface, of a finning 128, defined by a plurality of fins 128a, wherein this finning 128 houses a plurality of resistors 116, shaped as a collar, which have the function of keeping constantly hot the channels, and in particular the main channel 114, of the distribution and supply system 114 and of the injection device 112.

FIG. 14A also shows the electronic control unit 123 which controls the heating inductor 121 and which receives the signal from the thermocouple that detects the temperature in the area of the circular injection gate 125.

Experimental Tests Performed on the Moulding System of the Invention

For a more complete information and integration of the foregoing description, in the following there will be presented the results of experimental tests that were carried out on some complete prototypes and on individual parts and groups of the system for the injection moulding of plastic material of the invention, in the course of its development, in order to verify its effective characteristics and performances.

Figure 15A:
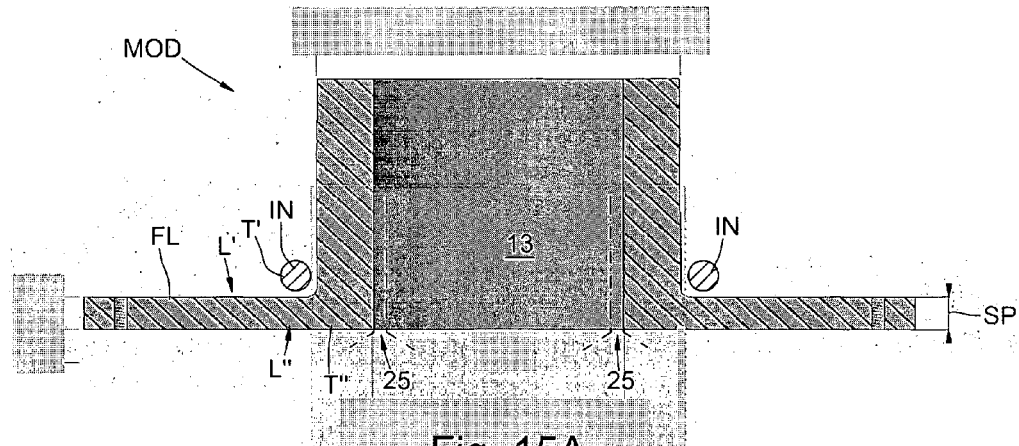
FIGS. 15A-15D are diagrams, models and simulations relating to experimental tests performed on prototypes of the system for injection moulding of the invention.

More in detail, a series of tests and trials, aimed at verifying the induction heating system of the injection moulding system 10 of the invention, have been performed on a test model, indicated with MOD and shown in FIG. 15A.

In particular, this model MOD is constituted by a flanged sleeve provided at one end of a flange FL, so as to be able to simulate, thanks to this flanged shape, the sleeve 20 which houses and cooperates with the circular diaphragm 13 in order to convey the molten plastic material MP towards the circular gate 25.

Now the tests performed on this model or sleeve MOD having a thickness. SP, equal to 7.5 mm, of the respective flange FL, which in turn corresponds to and simulates the area of the circular injection 25 gate, demonstrated an excellent response of the moulding system 10, as shown by the graphs of FIGS. 15B and 15C.

Figure 15B:
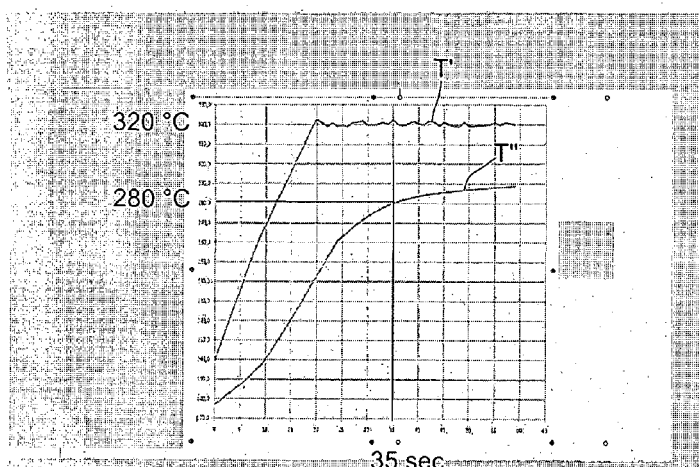

In particular, the graph of FIG. 15B shows that by activating an inductor IN, corresponding to the inductor 21 of the moulding system 10 described above, arranged adjacent to the inner side L' of the flange FL, so that the flange reaches a temperature T' of 320° C., the model MOD, i.e. the moulding system 10, reacts with an increase of the temperature T" to 280° C., along the outer side L", of the flange FL, arranged at the end of the sleeve MOD and therefore in the zone corresponding to that of the circular gate 25, in about 35 seconds, which is a reaction time compatible with a moulding cycle of about 63 seconds as the one indicated in the diagrams of FIGS. 8 and 9.

Figure 15D:
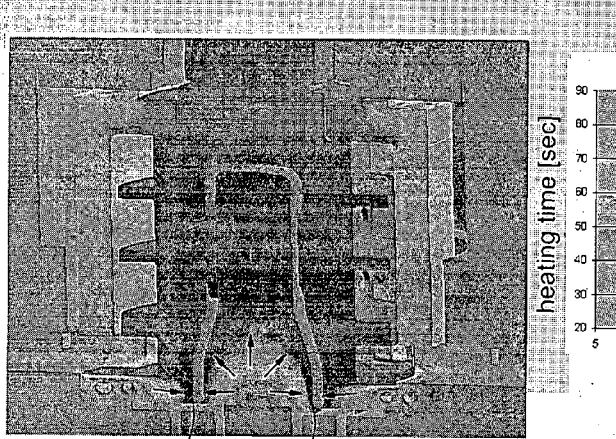
Figure 15C:
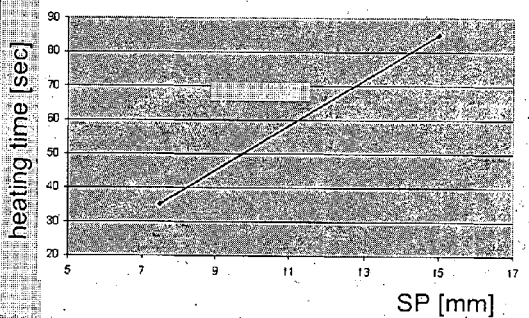

The diagram of FIG. 15C, in turn, shows that by reducing the thickness S, expressed in mm, of the flange FL, there is a great reduction of the heating time, in seconds, that is required to heat and bring at the requested temperature the region of the circular gate 25, thereby confirming the high speed response of the injection moulding system 10 for controlling the temperature of the molten plastic material MP as it passes through the gate 25 to access the internal cavities of the mould 11 which define the shape of the piece to be moulded.

Finally, the image of FIG. 15D relates to a thermal simulation of the moulding system of the invention and shows the temperature distribution in the area of the injection gate 25.

In particular, in this image arrows indicate how the temperature tends to rise closer to the circular injection gate 25.

It was also found that, for a wide range of possible applications, the consumption of electrical energy from the inductor 21 can be roughly estimated at about 6.5 kWh (kilowatt hour), which is a value considerably limited, and such as to not appreciably affect the overall consumption of the moulding machine in which the moulding system 10 of the invention is applied.

Thus, in summary, the results of these tests, other than confirming the innovative features of the moulding system of the invention, also show how this new system has very interesting potentialities and performances, such as to make it competitive and preferable when compared to the injection moulding systems already known and in use.

It is therefore clear from the foregoing description and the data included therein relating to the extensive experimentation that was carried out, that the present invention achieves in full the objects set, and in particular it provides a system for the injection moulding of plastic material which is particularly advantageous, both in terms of the surface quality of the finished pieces and of the operating costs, to mould pieces and parts which typically have a shape of a solid of rotation.

The invention claimed is:

1. A system for injection moulding of plastic material pieces exhibiting a form of a solid of revolution with external and/or internal cylindrical surfaces, comprising:
   an injection device for injection of a plastic material, in a molten state, into a mould;
   a circular diaphragm for distributing circularly and evenly into a cavity of the mould, through an opening of a circular injection gate having a circular or annular form, the plastic material that is injected by the injection device; and
   control unit, including a heating inductor, adapted to be driven in frequency, and a temperature sensor, both arranged in the zone of said circular injection gate,
   wherein said control unit is adapted to constantly control, during a moulding cycle of a piece and as a function of a temperature detected by said temperature sensor, the temperature of the zone of said circular injection gate, by suitably driving said heating inductor, and to control in real time the phases of said moulding cycle, including the phases of injection of the plastic material into the mould and of the opening and closing of the mould, and
   wherein said control unit is further adapted to control in real time, through said heating inductor, the temperature of the zone of said circular injection gate, during the injection phase of the plastic material into the mould, also by taking into account the physical and rheological characteristics of the plastic material that is used to mould the piece.

2. The system for the injection moulding of plastic material according to claim 1, wherein said injection device is associated with a distribution and feeding system, which is a hot-runner or warm channel, for distributing and feeding the plastic material in the molten state, and
   wherein said heating inductor is additional and structurally separate with respect to a heating means that are provided for maintaining warm the injection device and the channels of said distribution and feeding system.

3. The system for the injection moulding of plastic material according to claim 2, wherein the plastic material used for the moulding of the pieces is thermoplastic.

4. The system for the injection moulding of plastic material according to claim 1, wherein said mould is constituted by a fixed part, in which said circular diaphragm is integrated, and by a mobile part, that is adapted to move relatively to said fixed part between an open position, corresponding to an open configuration of said mould, and a closed position, corresponding to a closed configuration of said mould, and wherein said circular injection gate is formed in said fixed part along a separation plan that separates said fixed part and said mobile part in the closed configuration of the mould.

5. The system for the injection moulding of plastic material according to claim 1, wherein the physical and rheological characteristics, of a plurality of possible plastic materials usable to mould the piece are stored in a data base of the system, and wherein the system is capable of determining the range of temperature, within which the temperature of the zone of said circular injection gate has to be controlled during the moulding cycle of the piece, as a function of the specific material plastic that is selected by the operator.

6. The system for the injection moulding of plastic material according to claim 1, wherein the temperature range, within which the temperature of the zone of said circular injection gate has to be controlled during the moulding cycle of the piece, is set by an operator of the system.

7. The system for the injection moulding of plastic material according to claim 1, wherein said circular diaphragm and said circular injection gate are configured to avoid the execution of further works, once it is moulded.

8. The system for the injection moulding of plastic material according to claim 7, wherein further works include removal of scrap, sprues and/or other parts of scrap from the piece.

9. A method for the injection moulding of plastic material pieces that exhibit the form of a solid of revolution with external and/or internal cylindrical surfaces, through an injection moulding assembly or system comprising:
- an injection device for the injection of a plastic material, in the molten state, into a mould; and
- a circular diaphragm for distributing circularly and evenly into the cavity of a mould, through an opening of a circular injection gate having a circular or annular form, the plastic material that is injected by the injection device;

wherein the method comprises the following phases:
- detecting, through a temperature sensor, the temperature of the zone of said circular injection gate;
- controlling constantly, through a heating inductor, driven in frequency and arranged in the zone of said circular injection gate, and on the basis of the temperature detected by said sensor, the temperature of the zone of said circular injection gate; and
- controlling in real time the phases of the moulding cycle of a piece, including the phases of injection of the plastic material into the mould and of the opening and the closing of the mould, as a function of the temperature, as detected by said sensor, of the zone of said circular injection gate, wherein the phases of controlling in real time the temperature of the zone of said circular injection gate and the phases of the moulding cycle of the piece are carried out by taking into account data and, contained in a data base, concerning the characteristics and/or properties of the specific plastic material that is used to mould the piece.

* * * * *